US012712260B2

(12) United States Patent
Stagg et al.

(10) Patent No.: US 12,712,260 B2
(45) Date of Patent: Aug. 18, 2026

(54) REPLACEABLE ANTENNA CABLE CONNECTOR

(71) Applicant: ZEBRA TECHNOLOGIES CORPORATION, Lincolnshire, IL (US)

(72) Inventors: Adrian J. Stagg, Belfountain (CA); Ricardo F. Perez, New Haven, CT (US); Benjamin Jean Limongi, Marseilles (FR); Daniel Baldwin, East Northport, NY (US); Hsinwei Huang, New Taipei City (TW); Chungwei Hung, New Taipei City (TW)

(73) Assignee: Zebra Technologies Corporation, Lincolnshire, IL (US)

( * ) Notice: Subject to any disclaimer, the term of this patent is extended or adjusted under 35 U.S.C. 154(b) by 69 days.

(21) Appl. No.: 18/385,348

(22) Filed: Oct. 30, 2023

(65) Prior Publication Data

US 2025/0141094 A1 May 1, 2025

(51) Int. Cl.
*H01Q 1/27* (2006.01)
*H01Q 1/22* (2006.01)
*H01Q 9/04* (2006.01)

(52) U.S. Cl.
CPC ........... *H01Q 1/273* (2013.01); *H01Q 1/2208* (2013.01); *H01Q 9/045* (2013.01)

(58) Field of Classification Search
CPC ....... H01Q 1/273; H01Q 1/2208; H01Q 9/045
USPC ........................................................... 248/74
See application file for complete search history.

(56) References Cited

U.S. PATENT DOCUMENTS

| | | | | |
|---|---|---|---|---|
| 5,309,328 | A * | 5/1994 | Lum ......................... | A45F 5/00 224/267 |
| 7,623,155 | B2 * | 11/2009 | Kelliher ................. | H04N 23/66 348/373 |
| 10,451,103 | B2 * | 10/2019 | Yoshida .................. | F16C 1/101 |
| 11,859,655 | B2 * | 1/2024 | Kuribayashi ........... | F16C 1/101 |

* cited by examiner

*Primary Examiner* — Anita M King

(57) ABSTRACT

An example disclosed antenna cable system is described herein. The system includes a device mount; a cable configured to be removably secured within a channel set in the device mount; a first retaining element disposed on the cable, the first retaining element configured to secure the cable to the device mount via a first securing element and a second securing element; and a second retaining element disposed along the cable within the channel, the second retaining element configured to restrain movement of the cable within the channel.

8 Claims, 6 Drawing Sheets

REPLACEABLE ANTENNA CABLE CONNECTOR

FIELD OF THE DISCLOSURE

This application relates generally to wearable devices and, more particularly, to wearable devices having replaceable radio frequency identification (RFID) antennas.

BACKGROUND

Traditional wearable devices may be installed and removed from wearable mounts. In the installation and removing of the wearable devices, antennas connected to the wearable device might encounter wear and tear as the cable connecting the antenna to the wearable device will have tension and shear forces applied to it as the user moves the wearable device around.

Accordingly, there is a need for improved wearable devices that can easily be disconnected from other attachable elements such as antennas.

SUMMARY

In some use cases, wearable devices having an RFID radio/radio with read/write capabilities, and two or more directional RFID antennas oriented in different directions are desired. One directional RFID antenna is inward facing, such as toward the user or below the wrist (e.g., disposed on the inside of the user's wrist or below the wrist and having a directional radiation pattern oriented for reading RFID tags on packages located on the inside of the user's hand and/or wrist), and another directional RFID antenna is outward facing from the user (e.g., in various embodiments, disposed on top of the user's hand or on the outside of the user's wrist and having a directional radiation pattern oriented for RFID communication sessions directed away from a user, such as toward a car/van/truck location adjacent to the user). In the illustrated embodiments, the components of wearable devices are distributed across a user's fingers, the back of their hand, the upper side of the user's wrist and the lower side the user's wrist to lower the profile of the wearable device. This also increases flexibility and distributes weight for comfort. In some embodiments, Bluetooth interconnections reduce interference with wrist and knuckle movements. There are many configurations possible. In one embodiment, one or both of the directional RFID antennas are activated based upon the object type and/or location of the object with which the wearable device is or will interface (e.g., activated automatically or manually via a user interface on the wearable device's display, including in response to a "screen" or "location" within an application running on the device). In an embodiment, the directional RFID antennas are integrated into a wrist and finger mounted support on which an RFID radio is disposed.

In an embodiment, the described disclosure includes a system comprising: a device mount; a cable configured to be removably secured within a channel set in the device mount; a first retaining element disposed on the cable, the first retaining element configured to secure the cable to the device mount via a first securing element and a second securing element; and a second retaining element disposed along the cable within the channel, the second retaining element configured to restrain movement of the cable within the channel.

Further embodiments including wherein the first securing element is a biased tab configured to secure the cable within the channel; and the second securing element is a first fastener element within the channel configured to receive a second fastener element through the first fastener element.

In another embodiment the channel has a channel width further comprising a section of the channel wherein the section has a section width; the section width is greater than the channel width; and the section is configured to receive a portion of the cable that is wider than the remaining cable.

In another further embodiment, the cable is connected to an antenna. Additionally, in an embodiment the antenna is configured to transmit a radio frequency identification (RFID) signal.

Additionally, or alternatively, in an embodiment, the securing apparatus is at least one biased connector and the at least one actuator acts against a biased force to move the at least one biased connector.

In a further embodiment, the first fastener element is configured to receive a fastener.

Alternatively, or additionally, in a further embodiment, a trigger attached to a data port of the device mount, wherein the data port aligns and mates with an installed device. Further, another embodiment includes wherein the trigger actuates a data capture process within the device.

In another embodiment, the device mount is configured to be worn on a user's hand.

In another further embodiment, a replaceable antenna arrangement configured to be installed within a mount, the replaceable antenna comprising: an antenna located on a first end of a cable; an antenna data connection located on a second end of the cable; a first restricting element configured to have a first securing element and a second securing element, the first restricting element positioned adjacent to the antenna data connection along the cable; and a second restricting element positioned between the first restricting element and the antenna.

In another embodiment, the cable is configured to be received by a channel set into the mounting element. Further, in another embodiment, the replaceable antenna is installed into the mounting element and a device is secured to the mounting element and aligns with the antenna.

In another embodiment, the second restricting element is a cylindrical collar positioned around the cable, the second restricting element having a friction press fit within the mounting element.

In a further embodiment, the first securing element is a biased tab configured to secure the cable within the channel; and the second securing element is a first fastener element within the channel configured to receive a second fastener element through the first fastener element.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
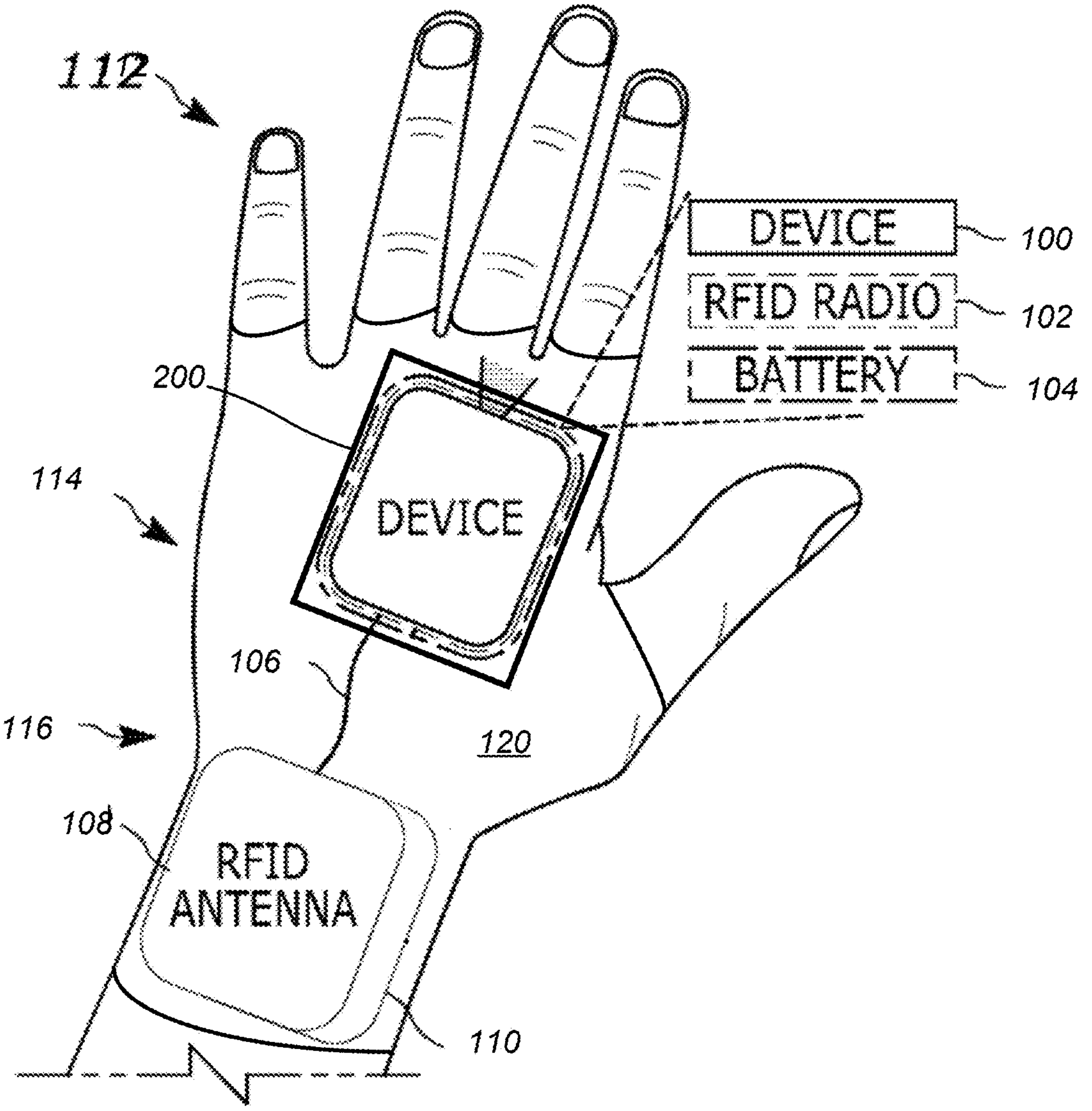
FIG. 1 illustrates an example hand and wrist mounted wearable device, in accordance with aspects of this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The disclosed embodiments will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a mobile computing device 100, or device 100, configured to capture data during operation by the user. In the illustrated embodiment, the device 100 includes a radio frequency identification (RFID) radio 102 and a battery 104 (collectively "device"). In other embodiments, the device 100 may include a barcode scanner, an imager, or similar data capture type features.

In the depicted embodiment, the device 100 is modular. The device 100 includes various units that can be combined to form different devices that are capable of different operations. The depicted device 100 is configured for installation onto a mount 200 such that the device 100 is secured to the user for ease of use. The device 100 as depicted in FIG. 1 is coupled to an RFID antenna 108 and trigger button (not shown). These additions allow the device 100 to operate as an RFID module, capable of capturing data from RFID signals via the RFID antenna.

When the RFID antenna 108 is separate from the device 100, a cable 106 is required for data communication between the RFID antenna 108 and the device 100. Through repeated use of the RFID antenna and cable 106, and the device 100 being transferred user to user, the cable 106 may need to be replaced from time to time after wear and tear to both the cable 106 and the connector element described further below. Having a quick and simplified method for replacing the RFID antenna 108 is advantageous to the end user as it will save time and therefore costs from other options that do not allow for RFID antenna removal from the device 100.

As depicted in FIG. 1, the cable 106 connects device 100 to the RFID antenna 108. When securing the cable 106 to the device 100 it is important to secure the cable 106 within a mount such that the cable 106 does not suffer a large amount of tensile strain which may result in destruction of the cable 106. Movement of the cable 106 within the mount may cause friction and rubbing as well which leads to wear and cable failure. By including multiple ways of securing the cable 106 within the mount we can ensure that the cable stays secure and doesn't move within the mount itself.

As depicted in FIG. 1, the device 100 is secured to the user's hand 112. The device 100 is secured via a back of hand mount 200, or mount 200, which will be described in further detail below. The device 100 is shown attached to a back surface 114 of the user's hand, however the device 100 as depicted may be shifted to other locations on the hand itself. The RFID antenna 108 is mounted to the user via an antenna mount 110. The antenna mount 110 allows the RFID antenna 108 to be disposed separately from the device 100. The RFID antenna 108 is attached to the device 100 via cable 106 and can be moved along the user's hand and/or wrist as needed. As depicted in FIG. 1, the RFID antenna 108 is secured to a wrist 116 of the user. The mount 200 is configured to be secured to the soft good 120 worn by the user so as to be disposed on the back of the user's hand. The mount 200 may also be secured to the wrist or fingers or other parts of the user's hands. The mount 200 is configured to receive the device 100 via elements which will be described further below.

Figure 2:
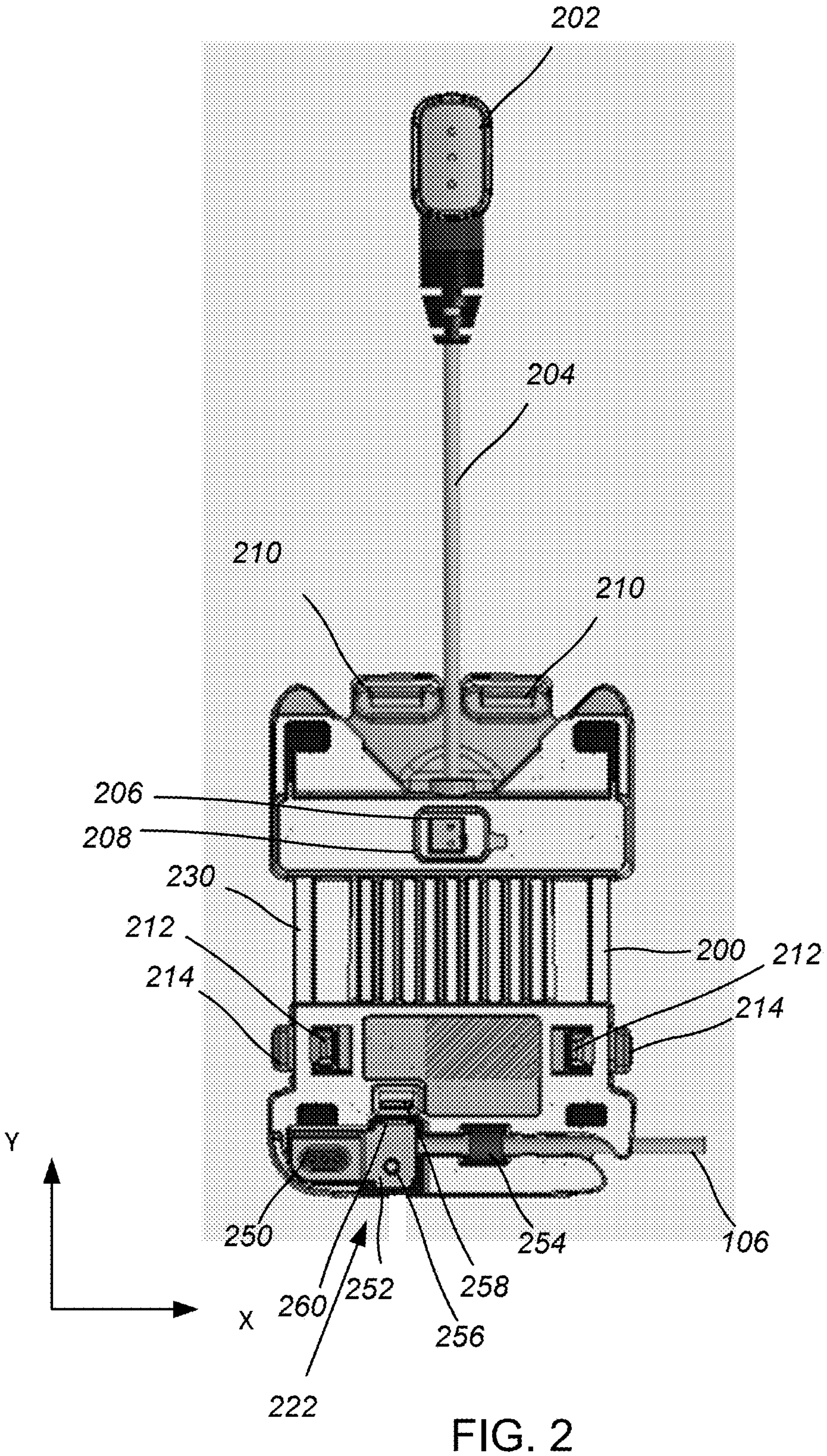
FIG. 2 illustrates an example back of hand mount according to example embodiments of the present disclosure.
Figure 4A:
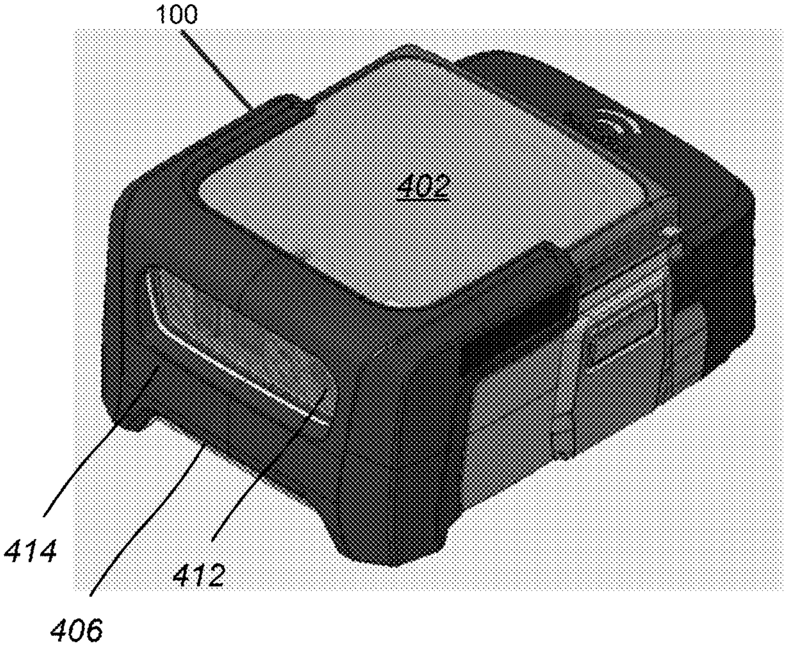
FIG. 4A illustrates a first orthogonal view of the device according to example embodiments of the present disclosure.
Figure 4B:
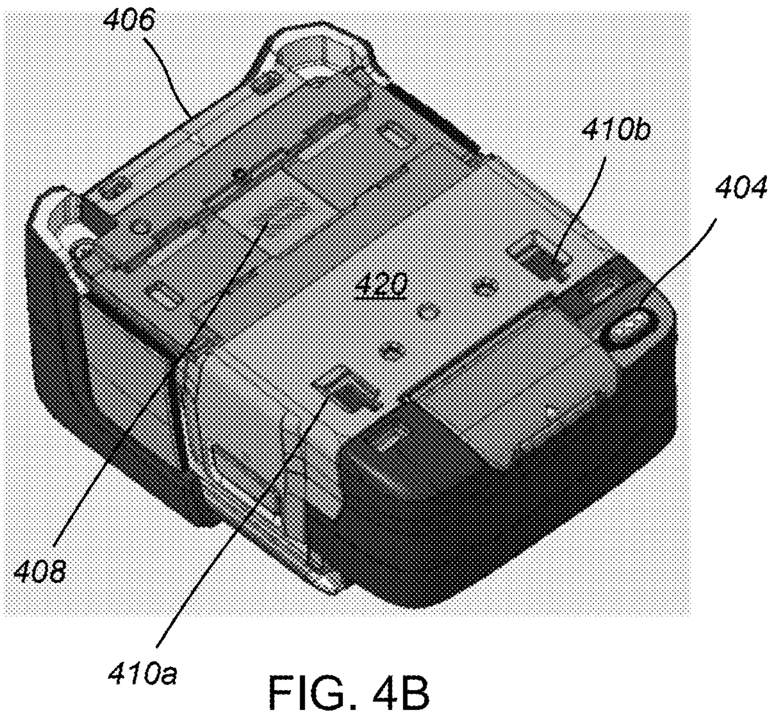
FIG. 4B illustrates a second orthogonal view of the device, the second orthogonal view from a direction opposite of the first orthogonal view according to example embodiments of the present disclosure.

As shown in FIG. 2, the mount 200 further allows for communication with the device 100 via a trigger element 202 (trigger 202) or the RFID antenna via cable 106. The mount 200 has a data port 206 that is electrically connected with the trigger 202. In the depicted embodiment, the connection is such that when the user actuates the trigger 202, a signal is sent via the trigger cable 204 through the data port 206 to the device 100. In the depicted embodiment, the trigger 202 is a button attached to a distal end of the trigger cable 204 wherein the other end of the trigger cable 204 is connected to the data port 206. The trigger 202 may be any other kind of actuating means that allows a user to translate a physical movement into an electrical signal as means of activating the device 100. In the depicted embodiment, the data port 206 is surrounded by a gasket 208. The gasket 208 prevents dust or debris from reaching the data port 206 and possibly damaging it. The data port 206 is communicatively coupled to the device 100 at communication port 408 as shown in FIG. 4B.

As depicted in FIG. 2, the device 100 is mounted to the mount 200 by securing one end of the device 100 to receiving tabs and then pivoting the device 100 into a locking position. The receiving tabs 210 are configured to protrude into securing ports of the device 100. The securing ports 406 of the device 100 can be seen on the front side of the device as seen in FIG. 4A. FIG. 4A will be discussed in more detail below.

Figure 3:
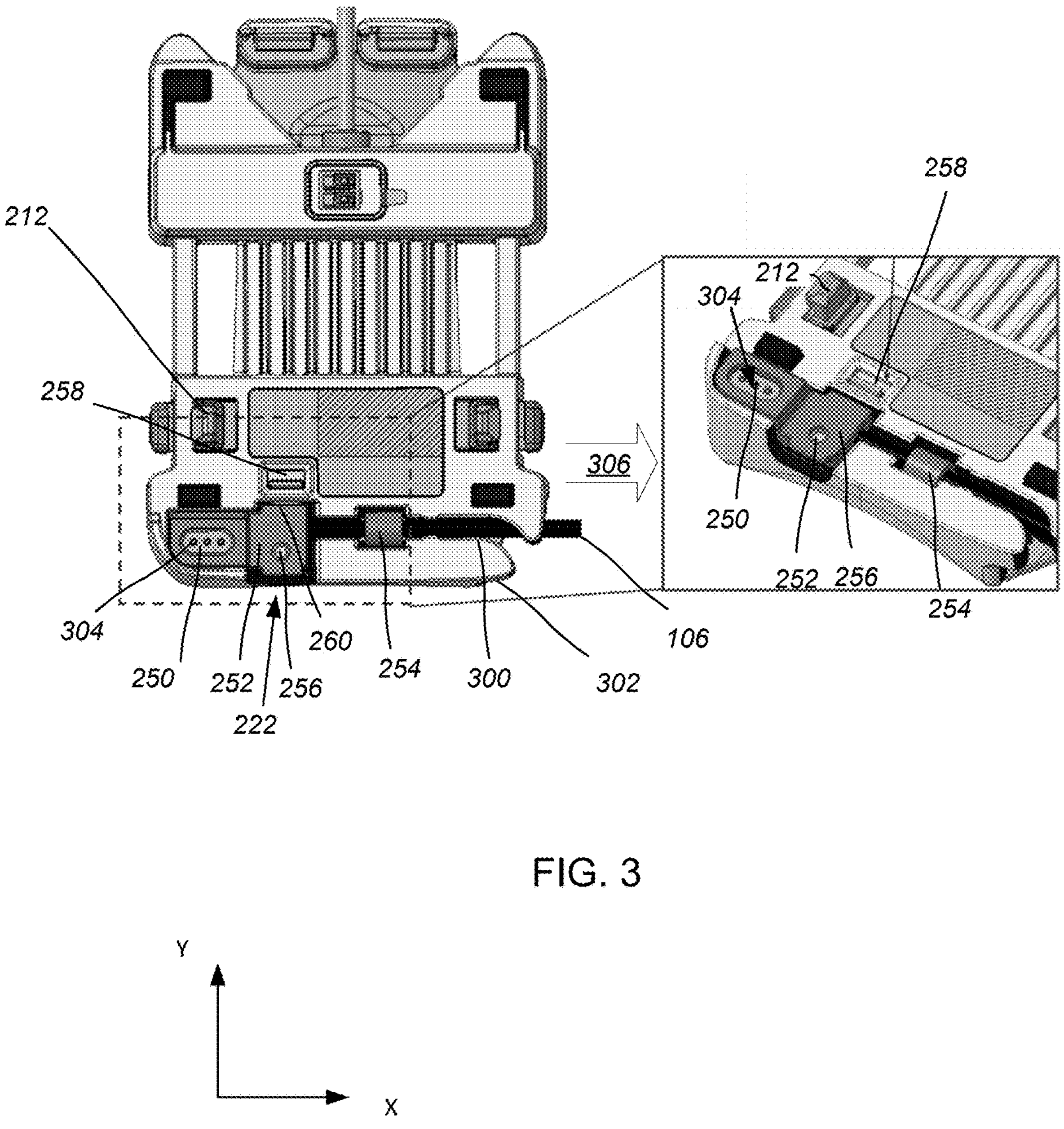
FIG. 3 illustrates an enhanced view of the back of hand mount from FIG. 2 according to an example embodiment of the present disclosure.

As depicted in FIG. 2, the receiving tabs 210 are configured to prevent movement of the device in the y-direction as indicated in FIG. 2. Once the front end of the device 100 is secured to the receiving tabs 210, the device 100 pivots downward such that the locking ports 410*a*,410*b* on the device 100 (seen in FIG. 4B) align with the locking tabs 212 of the mount 200. In the depicted embodiment, the locking tab 212 is biased such that the device 100 can be pushed downward onto the locking tab 212 and secure to a ledge of the locking tab 212 as can be seen in FIG. 3. While in the depicted embodiment, the locking tabs 212 are biased outward, in other embodiments the locking tabs 212 are configured to secure to the device 100 upon placement of the device 100 on to the mount 200. As depicted in FIG. 2, buttons 214 are configured to move the locking tabs 212 against the biasing force such that the device 100 can be removed from the locking tabs 212 and the mount 200.

Figure 5:
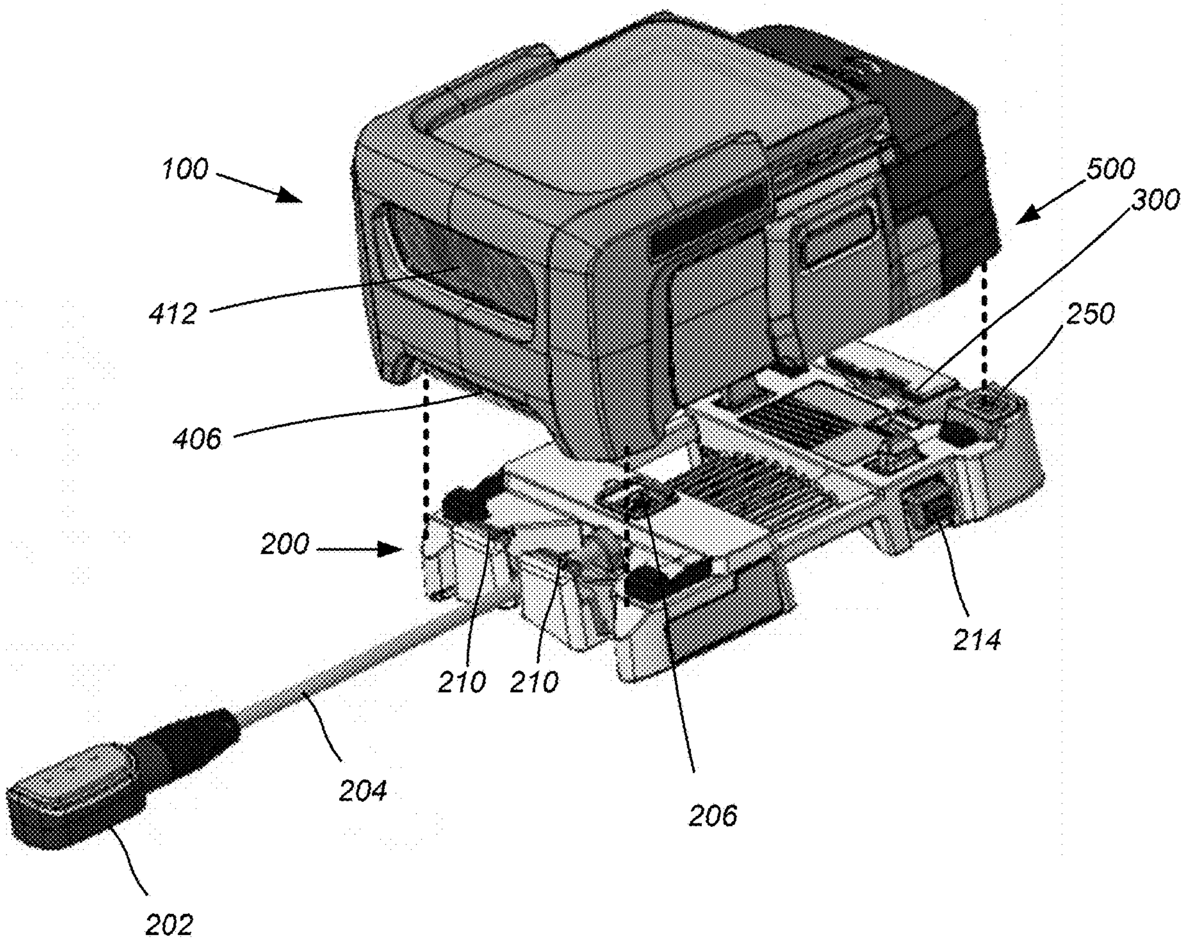
FIG. 5 illustrates an orthogonal, exploded view of the device and the mount according to example embodiments of the present disclosure.

FIG. 5 depicts an exploded view of the device 100 relative to the mount 200. The mount 200 is depicted with the trigger 202 and the trigger cable 204, which in the depicted embodiment, project from the mount 200 front a side opposite the location of the channel 300. The device 100 is oriented on the mount 200 such that the window is directed the same way as the trigger 202, which allows a user to aim their hand at a target and activate the trigger 202.

The receiving tabs 210 of the mount 200 align with the securing ports 406 of the device 100 such that the device 100 cannot move laterally in relation to the mount 200. Corner 500 of the device 100 includes a radio port (not seen in this view), which aligns during installation with the data connector 250.

Figure 6:
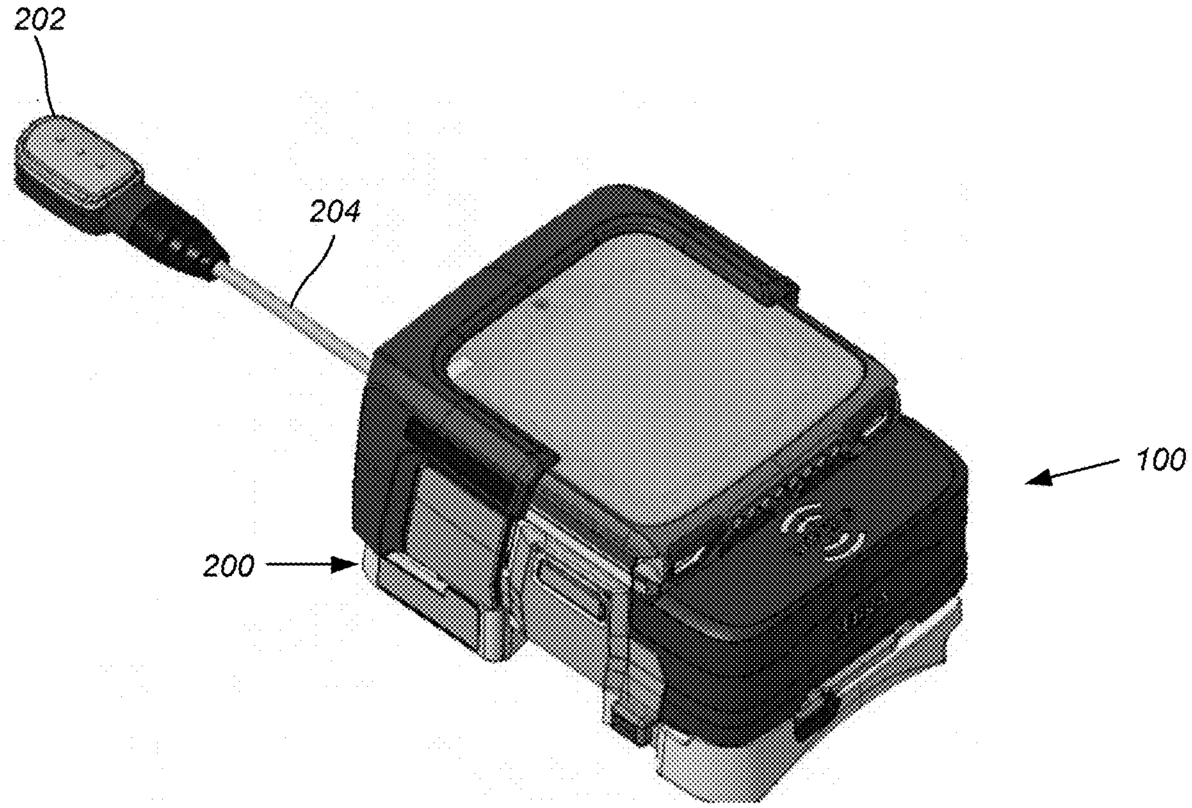
FIG. 6 illustrates an orthogonal view of the device secured to the mount according to example embodiments of the present disclosure.

FIG. 6 depicts the device 100 secured to the mount 200. Once the device 100 and the mount 200 are secured, the device 100 is not able to move independently form the mount 200. This causes the cable 106 to be further confined within the channel 300. The cable 106 is in communication with the device 100 and in the depicted embodiment, the device 100 can be operated by the user once secured to the back of the user's hand.

Referring back to FIG. 2, the mount 200 may further include a central area 230 configured to secure the mount 200 to the user. The mount 200 may be secured via various means such as a strap across the central area 230, a hook element, an elastic element, or other means known in the art to secure a base to a human user. While the mount 200 is configured to be attached to a user's hand, in other embodiments the mount 200 is attached to a user's forearm, finger, or other position which allows the user to secure the device 100 to themselves.

FIG. 2 further depicts cable 106 securing to a first end of the mount 200. The first end of the mount 200 is depicted opposite where the trigger cable is positioned however the trigger cable 204 may exit the mount 200 from any position. The cable 106 is configured to communicatively connect the RFID antenna 108 to the antenna cable connector 250. As mentioned above, the cable 106 is configured to be readily replaceable by the user, with a desire to be able to secure the cable 106 such that large stresses are not put onto the antenna cable connector 250 end of the cable 106.

FIGS. 2 and 3 further depicts an enhanced area of FIG. 2, focusing on the configuration of the cable 106 within the mount 200. The cable 106 is positioned within a channel 300. The channel 300, in the depicted embodiment, runs along a first side 302 of the mount 200. The channel 300 may be shaped to correspondingly fit the cable 106 and elements of the cable 106, such as opening 222 which is a segment of the channel configured to be wider to incorporate the first retaining element 252. Elements of the cable 106 may include the antenna signal connector 250, a first retaining element 252, and a second retaining element 254. The first retaining element 252 having a first securing element 258 and a second securing element 256, which will be discussed in further detail below.

As depicted in FIG. 3, the antenna cable connector 250 includes contact elements that allow the cable 106 to communication with the device 100. Antenna cable connector 250 features I/O pins 304, however it is appreciated that the I/O pins 304 may be any other type of means to transfer a signal from a cable to a device. The antenna cable connector 250, as depicted in FIG. 3 features three I/O pins 304 (or pogo pins), however it is appreciated that other embodiments may have more or less than three I/O pin 304. The I/O pins 304 allow communication to be sent from a radio port of the device 100 to the RFID antenna via the cable 106. In one embodiment, the I/O pins are spring loaded to allow for softer contact during connection as the I/O pins are configured to move slightly during contact. In the depicted embodiment, cable 106 is a coaxial cable. Coaxial cables communicate with a printed circuit board (PCB) which converts the signal moving from the coaxial cable to the pogo pin connector. Using a coaxial cable the length of cable 106 will offer less loss on the RF path overall than comparable other cable types that may be used.

In the depicted embodiment, the I/O pins 304 includes three pins. The three pins are linearly arranged and configured with a center pin and two outer pins positioned on each side the center pin. As depicted, the center pin is a signal pin, and the two outer pins are ground. This arrangement allows the preservation of the co-axial connection and controlled impedance through the antenna cable connector, where the spacing between the pins has an impact on impedance and insertion loss. In other embodiments, the I/O pin arrangement includes more than three pins. A person skilled in the art would understand that additional pins result in a better impedance match across the interface, which results in less signal loss through the interface.

A feature of the antenna signal connector 250 (or antenna cable connector) contact points includes ease of connection with the device 100. As described above, the device 100 is pivoted downward into securement with the mount 200, which aligns the radio port 404 with the I/O pins 304, the radio port 404 as seen in FIG. 4B. By having a contact signal connection in the depicted embodiment, the device 100 can align and mate with the antenna cable connector 250 and begin transmitting via the cable 106 and the RFID antenna.

As depicted in FIG. 3, the first retaining element 252 is configured to secure the cable 106 within the channel 300. The first retaining element 252 is part of the cable 106 and is configured to be secured to the mount 200. In the depicted embodiment, the first retaining element 252 includes a fastener element 256 and a slot 260. The fastener receiving element 256 may allow a fastener to be installed within the first retaining element 252 and fasten the first retaining element 252 to the mount 200. In an embodiment, the fastener element 256 receives a screw that is installed by the user such that the screw passes through the first retaining element 252 and enters the mount 200, which acts to secure the first retaining element 252 to the mount 200. Further, the first retaining element 252 includes the slot 260 which is configured to align with a tab element 258. In the depicted embodiment, the tab element 258 is a sliding switch having a body element that can traverse with movement of the tab element 258 and enter the slot 260 of the first retaining element 252. The tab element 258 within the slot 260 acts to retain the cable 106 within the channel 300. In one embodiment, during installation of the cable 106 within the channel 300, the user would position the first retaining element 252 and then actuate the tab element 258 into the slot 260. The mating of the tab element 258 and the slot 260 would prevent the first retaining element 252 from easily coming out of the channel 300. Then the user may install the screw into the fastener element 256 to further secure the cable 106 to the channel 300.

As depicted in FIG. 3, the first retaining element 252 is positioned adjacent to the connector 250 on the cable. In other embodiments, the connector 250 may be spaced apart from the connector 250 on the cable. The advantage to having the first retaining element 252 positioned adjacent to the connector 250 is that the first retaining element 252 is then able to restrict movement of the connector 250 to a higher degree as the two elements are close together and have less space to move independently.

As depicted in FIG. 3, the second retaining element 254 is attached to the cable 106 and may be friction fit within the channel 300. As depicted in the embodiment, the second retaining element 254 is a cylindrical collar positioned around the cable, reminiscent of a barrel around the cable which is fit into a corresponding region of the channel 300. The corresponding region of the channel 300 is wider than the other parts of the channel 300 such that the region can receive the barrel attachment. The barrel attachment is configured to retain the cable 106 in the X-direction, per the orientation provided in FIG. 3. In other words, if a force is applied to the cable 106 in a direction indication by 306, the force would be resisted by the second retaining element 254 which prevents the cable 106 from sliding. If the second retaining element 254 was not present and the force along direction 306 was applied, then the force may act on the antenna cable connector 250 which may cause wear and tear of the contacts against the device 100 due to movements of the connector 250 during contact. Additional possible means for the second retaining element 254 may include but are not limited to: an "S" shape channel section causing natural tension and forcing the cable to stay in place by friction, a collar around the cable which includes a screw hole, wherein a screw is tightened down to the mount via the screw hole to hold the cable in place, a spring loaded latch where the cable is forced between the latch and the side of the channel, such that the latch is forced to hold the cable in place once the cable is inserted, tape, or semi-permanent glue.

If the RFID antenna is damaged and needs to be replaced, a user would be able to take steps to remove the damaged RFID antenna and cable 106 and replace the antenna and cable 106 without needing to replace the entire device 100. During removal, the user would have to detach both the first and second retaining elements 252 and 254 respectively. To detach the first retaining element 252, the user first removes the fastener element within element 256. Once the fastener element is removed, the user then actuates the tab element 258 away from the first retaining element 252, which causes the tab element 258 to disengage with the slot 260. The user may then remove the cable 106 from the mount 200 and install a replacement cable via steps described above.

As depicted in FIGS. 4A and 4B, the device 100 is shown in a first perspective view in FIG. 4A and an opposite second perspective view than that to FIG. 4A in FIG. 4B. As depicted in FIG. 4A, a top side 402 of the device 100 is positioned opposite a bottom side 420 as shown in FIG. 4B. When the device 100 is secured to the mount 200, the bottom side 420 of the device 100 is against the mount 200 with the top side 402 opposite the device 100 from the mount 200.

As depicted in FIG. 4B, when the device 100 is secured to the mount 200, the radio port 404 is configured to transmissively mate with the cable 106. The radio port 404 is configured to transmit signals to the RFID antenna for broadcast by the RFID antenna.

As depicted on the bottom side 420 of the device 100, the communication port 408 is configured to receive signals from the trigger element. The actuation of the trigger element by the user will send a signal to the device 100 causing the device to initiate a data capture procedure such as RFID data capture. While the device 100 is connected to an RFID antenna for signal transmission, the device 100 may also be configured for image capturing or barcode scanning through a window 412 depicted in FIG. 4A.

As depicted in FIG. 4A, a front side 414 of the device 100 includes securing ports 406. The securing ports are configured to receive elements from the mount 200 for securing the device 100 to the mount 200. Once the securing ports 406 are mated, the device 100 pivots downwards such that locking ports 410*a*,410*b* can mate with the locking tabs of the mount 200. Once the elements all mate and secure, the device 100 is secured to the mount 200 and ready for operation.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

That which is claimed:

1. A system comprising:

a device mount;

a cable configured to be removably secured within a channel set in the device mount;

a first retaining element disposed on the cable, the first retaining element configured to secure the cable to the device mount via a first securing element and a second securing element;

a second retaining element disposed on the cable within the channel, the second retaining element configured to restrain movement of the cable within the channel; and a trigger cable secured between a trigger and a data port of the device mount, wherein the data port aligns and communicates with an installed device and the trigger actuates a data capture process within the installed device.

2. The system of claim 1, wherein the first securing element is a biased tab configured to traverse within the mount and secure the cable within the channel; and the second securing element is configured to fasten the first retaining element to the channel itself.

3. The system of claim 1, wherein the channel has a channel width further comprising a section of the channel wherein the section of the channel has a section width;

the section width is greater than the channel width; and the section is configured to receive the second retaining element.

4. The system of claim 1, wherein the cable is connected to an antenna.

5. The system of claim 4, wherein the antenna is configured to transmit a radio frequency identification (RFID) signal.

6. The system of claim 1, wherein the device mount is configured to be worn on a user's hand.

7. The system of claim 1, wherein the cable includes an antenna signal connector, the antenna signal connector is configured to control impedance by arranging spacing of individual connector elements.

8. A system comprising:

a device mount;

a cable configured to be removably secured within a channel set in the device mount;

a first retaining element disposed on the cable, the first retaining element configured to secure the cable to the device mount via a first securing element and a second securing element; and a second retaining element disposed on the cable within the channel, the second retaining element configured to restrain movement of the cable within the channel, wherein the cable is connected to an antenna configured to transmit a radio frequency identification (RFID) signal.

* * * * *